United States Patent
Leach et al.

(10) Patent No.: US 10,989,538 B2
(45) Date of Patent: Apr. 27, 2021

(54) IMU DATA OFFSET COMPENSATION FOR AN AUTONOMOUS VEHICLE

(71) Applicant: UATC, LLC, San Francisco, CA (US)

(72) Inventors: Marc Leach, Pittsburgh, PA (US); Mark Sibenac, Pittsburgh, PA (US); Robert Zlot, Pittsburgh, PA (US); Aaron Greenfield, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 229 days.

(21) Appl. No.: 16/140,897

(22) Filed: Sep. 25, 2018

(65) Prior Publication Data

US 2019/0186920 A1     Jun. 20, 2019

Related U.S. Application Data

(60) Provisional application No. 62/599,220, filed on Dec. 15, 2017.

(51) Int. Cl.
| | | |
|---|---|---|
| *G01C 21/16* | (2006.01) | |
| *G05D 1/02* | (2020.01) | |
| *G01C 21/30* | (2006.01) | |
| *G01C 25/00* | (2006.01) | |

(Continued)

(52) U.S. Cl.
CPC .......... *G01C 21/165* (2013.01); *G01C 21/30* (2013.01); *G01C 25/005* (2013.01); *G01S 17/86* (2020.01); *G01S 17/931* (2020.01); *G05D 1/0212* (2013.01); *G05D 1/0231* (2013.01); *G05D 2201/0213* (2013.01)

(58) Field of Classification Search
CPC .... G01C 21/165; G01C 25/005; G01C 21/30; G01S 17/86; G01S 17/931; G05D 1/0212; G05D 1/0231; G05D 2201/0213; G05D 1/0274; G05D 1/027
See application file for complete search history.

(56) References Cited

U.S. PATENT DOCUMENTS

| | | |
|---|---|---|
| 5,144,685 A | 9/1992 | Nasar |
| 8,521,352 B1 | 8/2013 | Ferguson |
| 8,676,430 B1 | 3/2014 | Ferguson |

(Continued)

FOREIGN PATENT DOCUMENTS

| | | |
|---|---|---|
| EP | 3032458 | 6/2016 |
| RU | 132393 | 9/2013 |

(Continued)

OTHER PUBLICATIONS

ISR in PCT/US2017/040532 dated Jan. 11, 2018.

(Continued)

*Primary Examiner* — Alan D Hutchinson
(74) *Attorney, Agent, or Firm* — Mahamedi IP Law LLP (57) ABSTRACT

A sensor data processing system of an autonomous vehicle can receive inertial measurement unit (IMU) data from one or more IMUs of the autonomous vehicle. Based at least in part on the IMU data, the system can identify an IMU data offset from a deficient IMU of the one or more IMUs, and generate an offset compensation transform to compensate for the IMU data offset from the deficient IMU. The system may then dynamically execute the offset compensation transform on the IMU data from the deficient IMU to dynamically compensate for the IMU data offset.

18 Claims, 5 Drawing Sheets

(51) Int. Cl.
*G01S 17/86* (2020.01)
*G01S 17/931* (2020.01)

(56) References Cited

U.S. PATENT DOCUMENTS

| | | |
|---|---|---|
| 8,825,265 B1 | 9/2014 | Ferguson et al. |
| 9,036,865 B2 | 5/2015 | Haas |
| 9,140,792 B2 | 9/2015 | Zeng |
| 9,459,625 B1 | 10/2016 | Ferguson |
| 9,672,446 B1 | 6/2017 | Vallespi-Gonzalez |
| 9,739,881 B1 | 8/2017 | Pavek |
| 9,841,763 B1 | 12/2017 | Valois |
| 9,902,403 B2 | 2/2018 | Donnelly |
| 9,904,375 B1 | 2/2018 | Donnelly |
| 10,527,427 B1* | 1/2020 | Jankowski .............. F42B 15/01 |
| 2008/0033645 A1 | 2/2008 | Levinson |
| 2010/0262359 A1 | 10/2010 | Motoyama |
| 2011/0054791 A1 | 3/2011 | Surampudi |
| 2012/0121161 A1 | 5/2012 | Eade |
| 2012/0296539 A1 | 11/2012 | Cooprider |
| 2012/0310516 A1 | 12/2012 | Zheng |
| 2013/0060461 A1 | 3/2013 | Wong |
| 2013/0117321 A1 | 5/2013 | Fischer |
| 2014/0005933 A1 | 1/2014 | Fong |
| 2014/0046585 A1 | 2/2014 | Morris, IV |
| 2015/0369617 A1 | 12/2015 | Ding |
| 2016/0125608 A1 | 5/2016 | Sorstedt |
| 2016/0167582 A1 | 6/2016 | Chen |
| 2016/0349063 A1 | 12/2016 | Maurer |
| 2017/0010363 A1* | 1/2017 | Friend ..................... G01S 19/49 |
| 2017/0023659 A1 | 1/2017 | Bruemmer |
| 2017/0227647 A1 | 8/2017 | Baik |
| 2017/0309172 A1 | 10/2017 | Linder |
| 2017/0315229 A1 | 11/2017 | Pavek |
| 2018/0045519 A1 | 2/2018 | Ghadiok |
| 2018/0061242 A1 | 3/2018 | Bavar |
| 2019/0154449 A1* | 5/2019 | Roumeliotis ........ G01C 21/165 |

FOREIGN PATENT DOCUMENTS

| | | |
|---|---|---|
| WO | WO2011/055978 | 5/2011 |
| WO | WO2014/147361 | 9/2014 |

OTHER PUBLICATIONS

ISR and WO in PCT/US2017/046796 dated Feb. 28, 2018.

ISR and Written Opinion in PCT/US2017/056277 dated Apr. 5, 2018.

Ansari, Partial Shape Recognition: A Landmark-Based Approach, CH2809-2/89/000-0831 IEEE 1989.

* cited by examiner

IMU DATA OFFSET COMPENSATION FOR AN AUTONOMOUS VEHICLE

CROSS REFERENCE TO RELATED APPLICATION

This application claims the benefit of priority to U.S. Provisional Application No. 62/599,220, titled "IMU Data Offset Compensation for an Autonomous Vehicle," filed on Dec. 15, 2017; which is hereby incorporated by reference in its entirety.

BACKGROUND

Autonomous vehicle technology typically relies on the fusion of sensor data to enable a computational control system of the autonomous vehicle to perform perception, prediction, motion planning, and vehicle control operations. A key aspect to autonomous vehicle systems is the continuously determining of the autonomous vehicle's state, which can include the vehicle's position, orientation, trajectory, velocity, etc. with respect to the world around it (e.g., in a global and/or local reference frame). These operations are referred to as localization operations, or the determination of the vehicle's pose. Various methods of localization require the use of a sensor suite, which can comprise any number and types of sensors, such as radar, LIDAR, image capture, sonar, infrared, positioning system, and/or inertial measurement unit sensors.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

An autonomous vehicle can include acceleration, braking, steering, and various other autonomously controllable auxiliary systems, such as lights, directional signals, windshield wipers, and the like. The autonomous vehicle can also include a perception sensor system generating sensor data comprising a sensor view of a surrounding environment of the autonomous vehicle. The perception sensor system can include any number of cameras (e.g., stereoscopic or monocular cameras), LIDAR sensors, sonar sensors, infrared sensors, radar, and/or other types of proximity or imaging sensors. In various examples, the autonomous vehicle can also include one or more inertial measurement units (IMUs), which can be utilized by an autonomous control system of the autonomous vehicle for various purposes. The control system can comprise one or more processors executing an instruction set, that cause the control system to process a sensor view generated by the perception sensor system to perform object detection operations and autonomously operate the acceleration, braking, and steering systems.

In various examples, the control system can further receive IMU data from the one or more IMUs, and identify an IMU data offset from a deficient IMU of the one or more IMUs. In certain implementations, the control system may then generate an offset compensation transform to compensate for the IMU data offset from the deficient IMU, and dynamically execute the offset compensation transform on the IMU data from the deficient IMU to dynamically compensate for the IMU data offset. In some aspects, the control system can determine whether the IMU data offset from the deficient IMU is within a set of plausibility thresholds, and generate the offset compensation transform in response to determining that the IMU data offset from the deficient IMU is within the set of plausibility thresholds, or discard the IMU data from the deficient IMU in response to determining that the IMU data offset from the deficient IMU is not within the set of plausibility thresholds.

Accordingly to various embodiments, the control system can identify the IMU data offset from the deficient IMU based on comparing the IMU data from at least two other IMUs of the three or more IMUs with the IMU data from the deficient IMU producing the IMU data offset. Additionally or alternatively, the control system can receive the sensor data from the perception sensor system and identify the IMU data offset from the deficient IMU based on comparing the IMU data from the deficient IMU with the sensor data from the perception sensor system.

As provided herein, the deficient IMU producing the IMU data offset can comprise a deviated or outlier IMU in a set of IMUs of an autonomous vehicle. In certain examples, the IMU producing the IMU data offset, or the deficient IMU, may comprise a faulty, damaged, poorly manufactured, or poorly calibrated IMU. In any case, the IMU data offset produced by the deficient IMU can be treated in accordance with example implementations described herein.

The autonomous vehicle can store a set of localization maps each comprising ground truth data of a particular road segment of a given region in which the AV operates. The control system can utilize the localizations maps to dynamically compare the ground truth data with a sensor view generated by the perception sensors of the autonomous vehicle. The control system can further dynamically perform sequential localization operations by dynamically comparing the sensor view with a current localization map of a set of stored localization maps on the AV. In certain aspects, the sequential localization operations can be dynamically performed at a first rate (e.g., less than ten Hertz), and the control system can determine a current state of the autonomous vehicle, based on the IMU data, at a second rate that is greater than the first rate (e.g., on the order of hundreds of Hertz). Furthermore, for each of the sequential localization operations, the control system can determine a map-relative state of the autonomous vehicle at the first rate. As provided herein, the map-relative state and the current state can correspond to respective estimations of at least one of an orientation, a trajectory, a position in a local reference frame, a position in a global reference frame, a velocity, and/or acceleration of the autonomous vehicle.

According to examples described herein, the control system can correlate the map-relative state of a previous localization operation with the current state between each sequential localization operation. For example, the control system can perform this correlation to determine whether the map-relative state from the previous localization operation is within a set of tolerance thresholds from the current state of the autonomous vehicle as determined from the IMU data. Accordingly, the control system can confirm whether the map-relative state from the localization operation matches the current state as determined from the IMU data, within tolerable error ranges. In various examples, the sequential set of localization operations can correspond to a map-relative filter (e.g., a map-relative Kalman filter), and determining the current state of the autonomous vehicle based on the IMU data can correspond to a continuous pose filter (e.g., a continuous pose Kalman filter). As described herein, when the current state and the map-relative state diverge beyond the tolerable error ranges, the control system can perform further processing to determine whether the error is the result of one or more deficient IMUs, and if so, implement one or more corrective actions, as further described herein.

Among other benefits, the examples described herein achieve a technical effect of mitigating or solving for the effects one or more deficient IMUs of an autonomous vehicle. These effects can result in an uncorrelated state between a map-relative filter (e.g., a map-relative Kalman filter), relying on stored localization maps and live sensor data, and a continuous pose filter (e.g., a continuous pose Kalman filter), relying on IMU data. When correlation between the estimated states diverge beyond a certain set of threshold values, the control system of the AV may enter a stuck state until the error is resolved or overridden. The examples described herein may self-diagnose by automatically performing additional analysis on the sensor data and attributing the error to one or more deficient IMUs. Thereafter, the autonomous vehicle control system, or a backend assistance system in communication with the autonomous vehicle, can generate one or more offset transforms executable by the autonomous control system to dynamically compensate or correct for the IMU deficiency.

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic. An action performed automatically, as used herein, means the action is performed without necessarily requiring human intervention.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In one embodiment, a software module is implemented with a computer program product including a computer-readable non-transitory medium containing computer program code, which can be executed by a computer processor for performing any or all of the steps, operations, or processes described. As such, one or more general purpose processors coupled to the computer-readable medium correspond to a special purpose processor system for performing the steps, operations, or processes described herein. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Numerous examples are referenced herein in context of an "autonomous" vehicle. The term autonomous vehicle refers to a vehicle that is operated in a state of automation with respect to at least steering and propulsion. Different levels of autonomy may exist with respect to autonomous vehicles. For example, some vehicles may enable automation in limited scenarios, such as on highways, provided that drivers are present in the vehicle. More advanced autonomous vehicles can drive without any human assistance from within or external to the vehicle.

Example Systems

Figure 1:
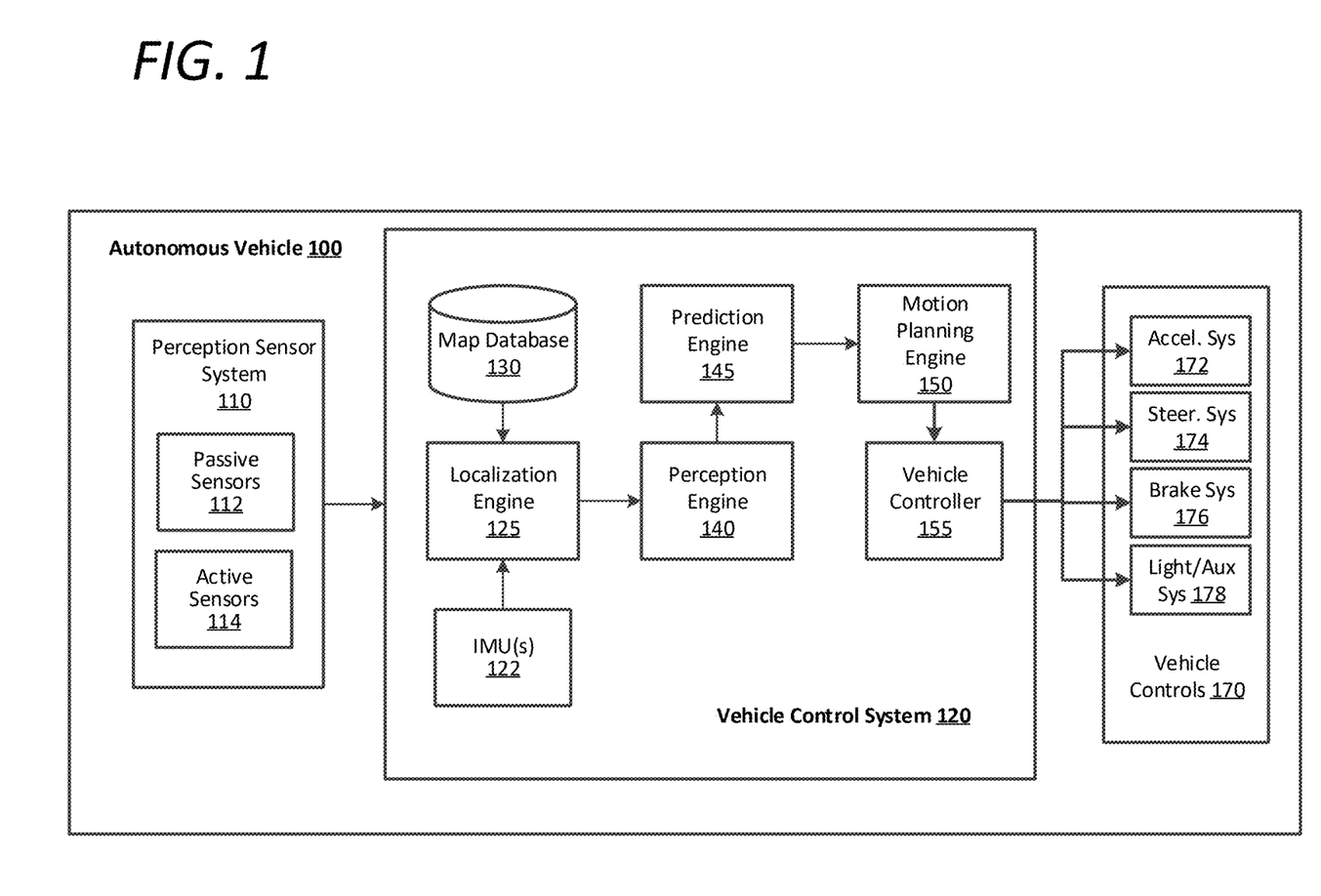
FIG. 1 is a block diagram illustrating an autonomous vehicle including an autonomous control system, according to examples described herein.

FIG. 1 is a block diagram illustrating an autonomous vehicle including an autonomous control system, according to examples described herein. In an example of FIG. 1, a vehicle control system 120 can autonomously operate the autonomous vehicle 100 a given region for a variety of purposes, including transport services (e.g., on-demand transport, freight and delivery services, etc.). In examples described, the autonomous vehicle 100 can operate without human control. For example, the autonomous vehicle 100 can autonomously steer, accelerate, shift, brake, and operate lighting components. Some variations also recognize that the autonomous vehicle 100 can switch between an autonomous mode, in which the vehicle control system 120 autonomously operates the vehicle 100, and a manual mode in which a qualified driver takes over manual control of the acceleration system 172, steering system 174, braking system 176, and lighting and auxiliary systems 178 (e.g., directional signals and headlights).

According to some examples, the vehicle control system 120 can utilize a perception sensor system 110 to autonomously operate the vehicle 100 in a variety of driving environments and conditions. For example, the vehicle control system 120 can operate the vehicle 100 by autonomously operating the steering, acceleration, and braking systems 172, 174, 176 of the vehicle 100 to a specified destination. The control system 120 can perform low-level vehicle control actions (e.g., braking, steering, accelerating) and high-level route planning using sensor information, as well as other inputs (e.g., transmissions from remote or local human operators, network communication from other vehicles, a freight transport coordination system, etc.).

In an example of FIG. 1, the vehicle control system 120 includes computational resources (e.g., processing cores and/or field programmable gate arrays (FPGAs)) which operate to process sensor data received from the perception sensors 110 of the vehicle 100. The perception sensors 110 can provide a sensor view of a surrounding environment of the vehicle 100. The sensor data can be processed to determine actions which are to be performed by the vehicle 100 in order for the vehicle 100 to continue on a route to a particular destination, or in accordance with a set of transport instructions received from a remote on-demand transport service. In some variations, the vehicle control system 120 can include other functionality, such as wireless communication capabilities using a communications module, to send and/or receive wireless communications over one or more networks with one or more remote sources. In controlling the autonomous vehicle 100, the control system 120 can generate commands to control the various vehicle control mechanisms 170 of the autonomous vehicle 100, including the acceleration system 172, steering system 174, braking system 176, and auxiliary systems 178 (e.g., lights and directional signals).

The autonomous vehicle 100 can be equipped with multiple types of sensors 110 which can combine to provide a computerized perception, or sensor view, of the space and the physical environment surrounding the autonomous vehicle 100. Likewise, the control system 120 can operate within the autonomous vehicle 100 to receive sensor data from the perception sensors 110 and control the various vehicle controls 170 in order to autonomously operate the vehicle 100. For example, the control system 120 can analyze the sensor data to generate low level commands executable by the acceleration system 172, steering system 174, and braking system 176 of the autonomous vehicle 100. Execution of the commands by the control mechanisms 170 can result in throttle inputs, braking inputs, and steering inputs that collectively cause the autonomous vehicle 100 to operate along sequential road segments according to a route plan.

In more detail, the perception sensors 110 operate to collectively obtain a live sensor view for the vehicle control system 120 (e.g., in a forward operational direction, or providing a 360 degree sensor view), and to further obtain situational information proximate to the autonomous vehicle 100, including any potential hazards or obstacles. By way of example, the sensors 110 can include a set of passive sensors 112 and a set of active sensors 114. The passive sensors 112 can include any number of stereoscopic or monocular cameras, infrared or other proximity sensors. The active sensors 114 can include sensors that emit electromagnetic radiation to detect return signals (e.g., LIDAR or radar), and in some example, can also include one or more ultrasonic sensors that emit ultrasonic sounds waves and detect return signals (e.g., return pressure pulses) to enable the control system 120 to perform ranging operations. In addition, the vehicle can further include one or more position sensors, such as a GPS module (not shown).

In various examples, the perception sensors 110 can be arranged in a sensor suite or sensor arrays mounted to the exterior of the autonomous vehicle 100, such as on the front bumper and roof. In general, the perception sensors 110 collectively provide sensor data to a localization engine 125 and perception engine 140 of the vehicle control system 120. The localization engine 125 can access a data storage 130 comprising localization maps of the given region in which the autonomous vehicle 100 operates. The localization maps can comprise a series of road segment sub-maps that enable the localization engine 125 dynamically determine an estimated state of the autonomous vehicle 100 (e.g., the "map-relative" estimated state).

As described herein, the "estimated state," "map-relative state," and "current state" of the autonomous vehicle can comprise estimations of the vehicle's pose using different data sets, such as IMU data, positioning data (e.g., from a GPS module), or live sensor data (e.g., comprising LIDAR, image, radar, IR, and/or sonar data). The pose can comprise the vehicle's position (e.g., in a global and/or local reference frame), orientation, velocity, trajectory, and the like. In dynamically determining and/or estimating the state of the vehicle, the localization engine 125 can execute a number of filters (e.g., Kalman filters) that process separate data sets to each provide a highly granular estimation of the vehicle's state. These estimations can be determined at differing rates (e.g., dependent on the rate that sensor data is received by the filter), and can be correlated with each other in a confirmation process of the vehicle's state. In various examples, the localization engine 125 can execute a "map-relative" filter, in which sensor data from the perception sensors 110 are processed in relation to a current localization map, and a "continuous pose" filter that receives IMU data from one or more IMUs 122 of the autonomous vehicle 100. As described herein, the rate at which sensor data is received from the IMU(s) 122 (e.g., from accelerometers, gyroscopes, and/or magnetometers) can be on the order of hundreds of cycles per second, whereas sensor data received from the perception sensors 100 may be on the order of single digit cycles per second. Detailed description of the localization operations performed by the localization engine 125 is provided below with respect to FIG. 2.

In various examples, the perception engine 140 can further access the localization maps to perform dynamic comparisons with the live sensor view, and to perform object detection and classification operations. As provided herein, the localization maps can comprise highly detailed ground truth data of each road segment on which the autonomous vehicle 100 can travel. For example, the localization maps can encompass long stretches of highways, city road segments, and the like. The localization maps can comprise prerecorded and fused data (e.g., sensor data including image data, LIDAR data, and the like) by specialized mapping vehicles or autonomous vehicles with recording sensors and equipment, and can be processed to pinpoint various objects of interest (e.g., traffic signals, road signs, and other static objects). As the control system 120 autonomously operates the vehicle 100 along a given route, the perception engine 140 can access sequential localization maps of current road segments to compare the details of a current localization map with the sensor data in order to detect and classify any objects of interest, such as road debris, other vehicles, pedestrians, bicyclists, and the like.

In various examples, the perception engine 140 can dynamically compare the live sensor data from the autonomous vehicle's sensors 110 to the current localization map as the autonomous vehicle 100 travels through a corresponding road or highway segment. The perception engine 140 can identify and classify any objects of interest in the live sensor data that can indicate a potential hazard. In accordance with many examples, the perception engine 140 can provide object of interest data to a prediction engine 145 of the control system 120, where the objects of interest can each be classified (e.g., a pedestrian, a bicyclist, unknown objects, other vehicles, a static object, etc.).

Based on the classification of the detected objects, the prediction engine 145 can predict a path of each object of interest and determine whether the vehicle control system 120 should respond or react accordingly. For example, the prediction engine 145 can dynamically calculate a collision probability for each object of interest, and generate event alerts if the collision probability exceeds a certain threshold. As described herein, such event alerts can be processed by a motion planning engine 150 along with a processed sensor view indicating the classified objects within the live sensor view of the autonomous vehicle 100. The vehicle controller 155 can then generate control commands executable by the various vehicle controls 170 of the autonomous vehicle 100, such as the acceleration, steering, and braking systems 172, 174, 176. In certain examples, the motion planning engine 150 can determine an immediate, low level trajectory and/or higher-level plan for the autonomous vehicle 100 based on the event alerts and processed sensor view (e.g., for the next 100 meters, up to a next intersection, or for a certain distance along a highway).

On a higher level, the motion planning engine 150 can provide the vehicle controller 155 with a route plan to a given destination, such as a pick-up location, a drop off location, or other destination within a given road network. In various aspects, the motion planning engine 150 can generate the route plan based on transport instructions received from a remote on-demand transport service (e.g., over a wireless communication network). On a lower level, the motion planning engine 150 can provide the vehicle controller 155 with an immediate trajectory for the autonomous vehicle 100 based on the objects of interest, obstacles, and collision probabilities identified and determined by the perception and prediction engines 140, 145. The vehicle controller 155 can generate the appropriate control commands executable by the vehicle controls 170 accordingly.

Figure 2:
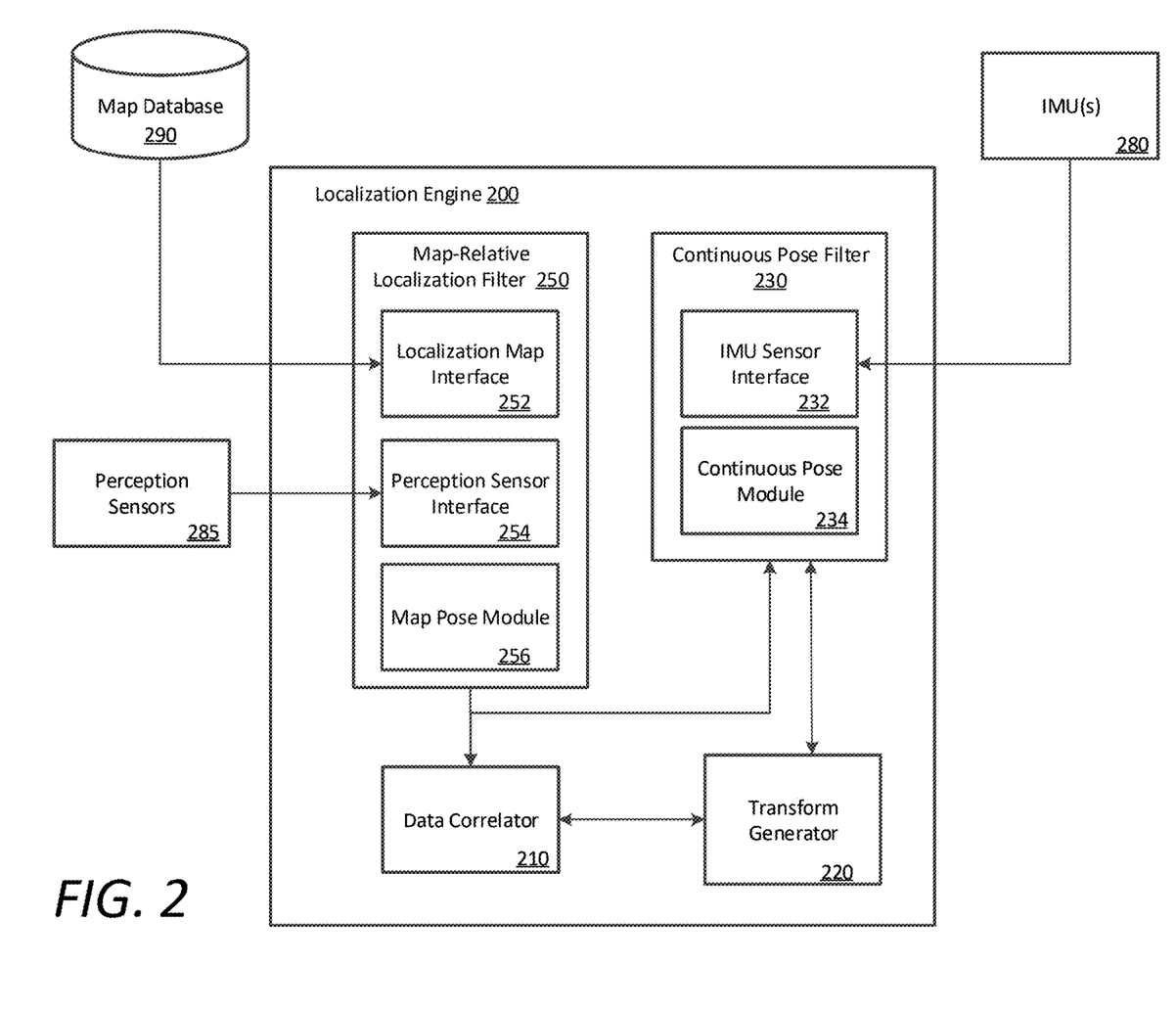
FIG. 2 is a block diagram illustrating a localization engine in communication with various components of the autonomous vehicle, according to various embodiments.

FIG. 2 is a block diagram illustrating a localization engine 200 in communication with various components of the autonomous vehicle 100, according to various embodiments. The localization engine 200 shown in FIG. 2 can correspond to the localization engine 125 described in connection with FIG. 1, and can access a map database 290 that stores the localization maps, the perception sensors 285 that provide the fused live sensor view of the vehicle's surroundings, and one or more IMUs 280 which provide high-rate sensor data from one or more gyroscopic sensors, accelerometers, and/or magnetometers. The localization engine 200 can execute a map-relative localization filter 250 and a continuous pose filter 230. The filters described herein can comprise a set of algorithms that receive sensor data to generate a state estimation of the vehicle (e.g., position, orientation, trajectory, velocity, etc.). According to certain aspects, these algorithmic sets can comprise filters (e.g., Kalman filters, convolutional neural network (CNN) filter, or machine learned algorithm) that each dynamically generate respective state estimations for the vehicle. In various examples, the localization engine 200 can execute additional filters (not shown) with different sensor data inputs, such as positioning data, radar data, or sonar data.

The IMU data can be received from the IMUs 280 at a certain rate (e.g., on the order of hundreds or thousands of Hertz), and can vary across different IMUs. In certain examples, the IMUs 280 can comprise one or more micro-electro-mechanical system (MEMS) IMUs. Additionally or alternatively, the IMUs 280 can comprise a original equipment manufacturer (OEM) IMU integrated with the vehicle. For example, if the autonomous vehicle 100 is retrofitted from a normal human-driven vehicle to include the various autonomy components (e.g., perception sensors, a computer stack comprising FPGAs and CPUs, additional wiring, and vehicle control module operating the vehicle's control mechanisms), the autonomy components may be patched into the OEM IMU to receive additional IMU data. Additionally or alternatively, the IMUs 280 can comprise a state-of-the-art, precision fiber optic gyro (FOG)-based IMU that provides high quality IMU data. However, example described herein recognize that while relatively expensive FOG IMUs may provide higher quality IMU data, the inclusion of a data correlator 210 and its data correlation functions between multiple IMUs 280 and the output of the map-relative localization filter 250 can render such FOG IMUs unnecessary. Accordingly, the data correlator 210 can act as a cost savings mechanism for autonomy systems.

In various implementations, the continuous pose filter 230 can include an IMU sensor interface 232 that receives IMU data from the IMU(s) 280. The continuous pose filter 230 can further include a continuous pose module 234 that dynamically determines the current state of the vehicle (e.g., position and trajectory in relation to a previous iteration) based on the IMU data. Embodiments described herein recognize that the continuous pose filter 230 is highly sensitive to the quality of the IMU data from the IMU(s) 280. Accordingly, any fault, deviation, or other deficiency in the IMU(s) 280 can result in an inaccurate current state estimation by the continuous pose filter 230. In certain implementations, the vehicle can include three or more IMUs 280, which the continuous pose module 234 can process to determine the estimated state. The localization engine 200 can include a data correlator 210 that can periodically or dynamically receive the IMU data from the IMUs 280 and determine whether any of the IMU data are anomalous. In one example, the data correlator 210 can receive the IMU data from the continuous pose filter 230 in response to an anomaly trigger. The anomaly trigger can correspond to a detected error from one or more of the IMUs 280, and/or the continuous pose module 234 generating implausible state estimations.

In certain implementations, the data correlator 210 can identify an IMU data offset from one of the IMUs 280 based on a comparison with IMU data from the other IMUs, which can be functioning nominally. The localization engine 200 can further include a transform generator 220 that can generate a transform executable by the continuous pose module 234 to dynamically compensate or correct for the IMU data offset. For example, factors such as temperature fluctuations, vibrations, the quality of the IMU, etc., can cause IMU data offsets or failure. In various examples, the data correlator 210 can compare the IMU data from the deficient IMU to determine whether the deficient IMU has a failure in one of its components, such as the gyroscope or accelerometer, or whether a consistent data offset exists.

In various aspects, the localization engine 200 can also include a map-relative localization filter 250, which can include a localization map interface 252, a perception sensor interface 254, and a map pose module 256. The localization map interface 252 can access sequential localization maps from the autonomous vehicle's on-board map database 290, or in certain aspects, can comprise wireless communication capabilities to access localization maps from a remote resource (e.g., a transport coordination system). For example, as the autonomous vehicle 100 drive throughout a given region, the localization map interface 252 can access a current localization map corresponding to a current road segment upon which the autonomous vehicle 100 is currently driving. When the autonomous vehicle 100 enters a next road segment corresponding to a different localization map, the map interface 252 can access this localization map from the map database 290 to enable the map pose module 256 to perform map-relative localization operations for the autonomous vehicle 100. Accordingly, the localization map interface 252 can sequentially access respective localization maps based on the dynamic position and/or trajectory of the autonomous vehicle 100 on any given road segment.

The perception sensor interface 254 can receive live sensor data from the perception sensors 285 of the autonomous vehicle 100. As described herein, the perception sensors 285 can comprise any number of cameras, LIDAR sensors, radar modules, sonar sensors, infrared sensors, other proximity sensors, and the like. As further described herein, the perception sensors 285 provide a live sensor view of the surrounding area of the autonomous vehicle 100. In some aspects, the perception sensor interface 254 can receive the sensor data from the perception sensors 285 as a certain rate, which can be significantly lower than the rate at which IMU data is received by the continuous pose filter 230.

The map pose module 256 can dynamically compare the live sensor view with a current localization map to estimate the current state of the autonomous vehicle 100. For example, the map pose module 256 can identify certain unique localization features within the current localization map (e.g., a church tower, a tall tree, a distant mountain, a billboard, a road sign, a tall building, etc.), and correlate the localization feature with the same feature in the live sensor data from the perception sensors 285 to precisely determine or estimate the autonomous vehicle's precise position, orientation, trajectory, velocity, and the like (e.g., the vehicle's "pose"). In certain aspects, the map pose module 256 can perform these localization operations at a given rate (e.g., one or two operations per second). For example, the map pose module 256 can be limited by the data rate at which sensor data is received from the perception sensors 285, the processing resources required to perform the operations, or a combination of the foregoing.

According to examples described herein, the data correlator 210 can receive the respective state estimations from the map pose module 256 and the continuous pose module 234. As described, the rate at which state estimations are received from the continuous pose module can be on the order of ten, one hundred, or one thousand multiples greater than the rate at which state estimations are received from the map pose module 256. For the sake of brevity, the state estimations received from the continuous pose module 234 are referred to herein as the "current state" of the autonomous vehicle 100, indicating the vehicle's estimated pose (e.g., position, orientation, trajectory, and/or velocity) as determined from the IMU data. The state estimations received from the map pose module 256 are referred to herein as the "map-relative state," also indicating the vehicle's estimated pose as determined from the live sensor view and localization map correlations.

The data correlator 210 can correlate the map-relative state and the current state based on a set of plausibility thresholds, and/or can attached weightings to various aspects of the map-relative state and current state. For example, the data correlator 210 can rely more heavily on the map-relative state for position, orientation, and trajectory estimations while relying more heavily on the current state for acceleration and velocity estimations. Furthermore, the data correlator 210 can recognize that without correlating the current state with the map-relative state, the current state may have a tendency to drift, due to the current state being based solely on the IMU data. Accordingly, the data correlator 210 dynamically corrects or compensates for this drift by correlating the current state with the map-relative state.

Furthermore, the data correlator 210 can near-instantaneously confirm the map-relative state based on the current state, based on the rate at which the current state is received from the continuous pose module 234. For example, while the data correlator 210 awaits a next map-relative state from the map pose module 256, the data correlator 210 can track the current state of the autonomous vehicle 100—which may drift slightly, but not significantly. Once the next map-relative state is received, the data correlator 210 perform the correlation, identify the parameters in which the current state has drifted (e.g., a position or trajectory drift), and transmit corrective state data to the continuous pose module 234 for recalibration. Accordingly, each iteration in which a map-relative state is received, the data correlator 210 can effectively cause the continuous pose module 234 to recalibrate to correct or compensate for any drift in its determined current state.

According to various examples, the data correlator 210 can also identify any anomalies in the current state as determined by the continuous pose module 234. For example, the data correlator 210 can determined whether one or more parameters of the current state exceeds a given plausibility threshold. In various aspects, this determination can be triggered by a map-relative state being determined by the map pose module 256. Accordingly, the data correlator 210 can compare the map-relative state to the current state to determine whether any of the parameters of the current state (e.g., position, trajectory, orientation, velocity, and/or acceleration) exceed a given plausibility threshold. If not, then the data correlator 210 can provide any corrective state data to the continuous pose module 234 for recalibration, and track the current state until the next map-relative state is received. However, if one or more parameters of the current state exceeds a plausibility threshold, then the data correlator 210 can trigger an additional correction action.

For example, the data correlator 210 can determine whether a deficient IMU is responsible by determining whether a consistent implausibility pattern exists in the current state. A consistent implausibility pattern can indicate an IMU data offset from a particular IMU. Additionally or alternatively, the data correlator 210 can determine whether a component of a deficient IMU has failed, such as the accelerometer or gyroscope, or whether the IMU has failed completely. If a consistent IMU data offset exists, the data correlator 210 can indicate the IMU data offset to the transform generator 220, which can generate an IMU data transform executable by the continuous pose model 234 to dynamically correct or compensate for the IMU data offset. Execution of the IMU data transform can compensate for the IMU data offset and enable the continuous pose module 234 to determine the current state of the vehicle more accurately.

In certain implementations, a deficient IMU may be generating unusable data, such as in the case of an accelerometer and/or gyroscope failure. In such scenarios, the data correlator 210 can transmit a command to the continuous pose filter 230 to disregard any data from the deficient IMU, and determine the current state based on IMU data from one or more nominally functioning IMUs, or correctively functioning IMU (e.g., using an IMU data offset transform).

Accordingly, the data correlator 210 can dynamically output a state estimation of the autonomous vehicle 100—based on correlations between the map-relative state and the current state—to at least one of the perception engine 140, the prediction engine 145 and the motion planning engine 150 to enable the vehicle control system 120 of the autonomous vehicle 100

Methodology

Figure 3:
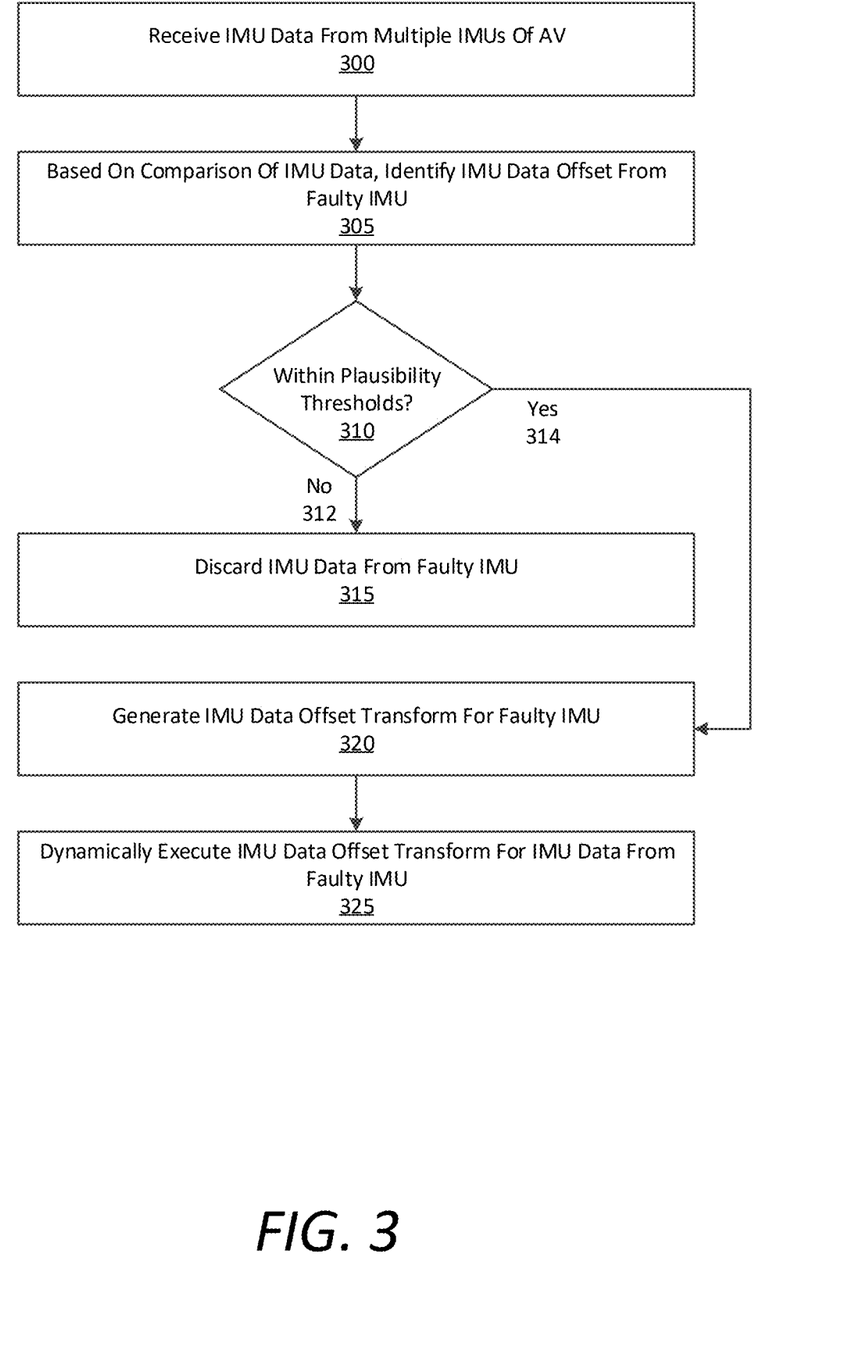
FIG. 3 is a flow describing a multi-IMU method of detecting and compensating for IMU data offset, according to various example embodiments.

FIG. 3 is a flow describing a multi-IMU method of detecting and compensating for IMU data offset, according to various example embodiments. In the below description of FIG. 3, reference may be made to reference characters representing one or more features as shown and described with respect to FIGS. 1 and 2. Furthermore, the processes described in connection with FIG. 3 may be performed by one or more processing components of the vehicle control system 120 of FIG. 1. Referring to FIG. 3, the control system 120 can receive IMU data from multiple IMUs 280 of the autonomous vehicle 100 (300). The control system 120 can further identify an IMU data offset from a deficient IMU based on a comparison of the IMU data (305). For example, the control system 120 can compare IMU data from three or more IMUs to determine that IMU data from one of the IMUs is not accurate.

In various examples, the control system 120 can determine whether the IMU data from the deficient IMU is within a set of plausibility threshold (310). The plausibility thresholds can correspond to tolerable error ranges that the transform generator 220 can correct or compensate with a generated data transform. For example, the deficient IMU may register accelerometer data that is slightly off from the other IMUs. In such a scenario, the IMU data from the deficient IMU can be corrected or compensated for.

If the IMU data is not within the set of plausibility thresholds (312), then the vehicle control system 120 can discard the IMU data from the deficient IMU (315). However, if the IMU data from the deficient IMU is within the set of plausibility thresholds (314), then the vehicle control system 120 can generate an IMU data offset transform for the deficient IMU (320). Thereafter, the vehicle control system 120 can dynamically execute the IMU data offset transform for the IMU data from the deficient IMU (325).

Figure 4:
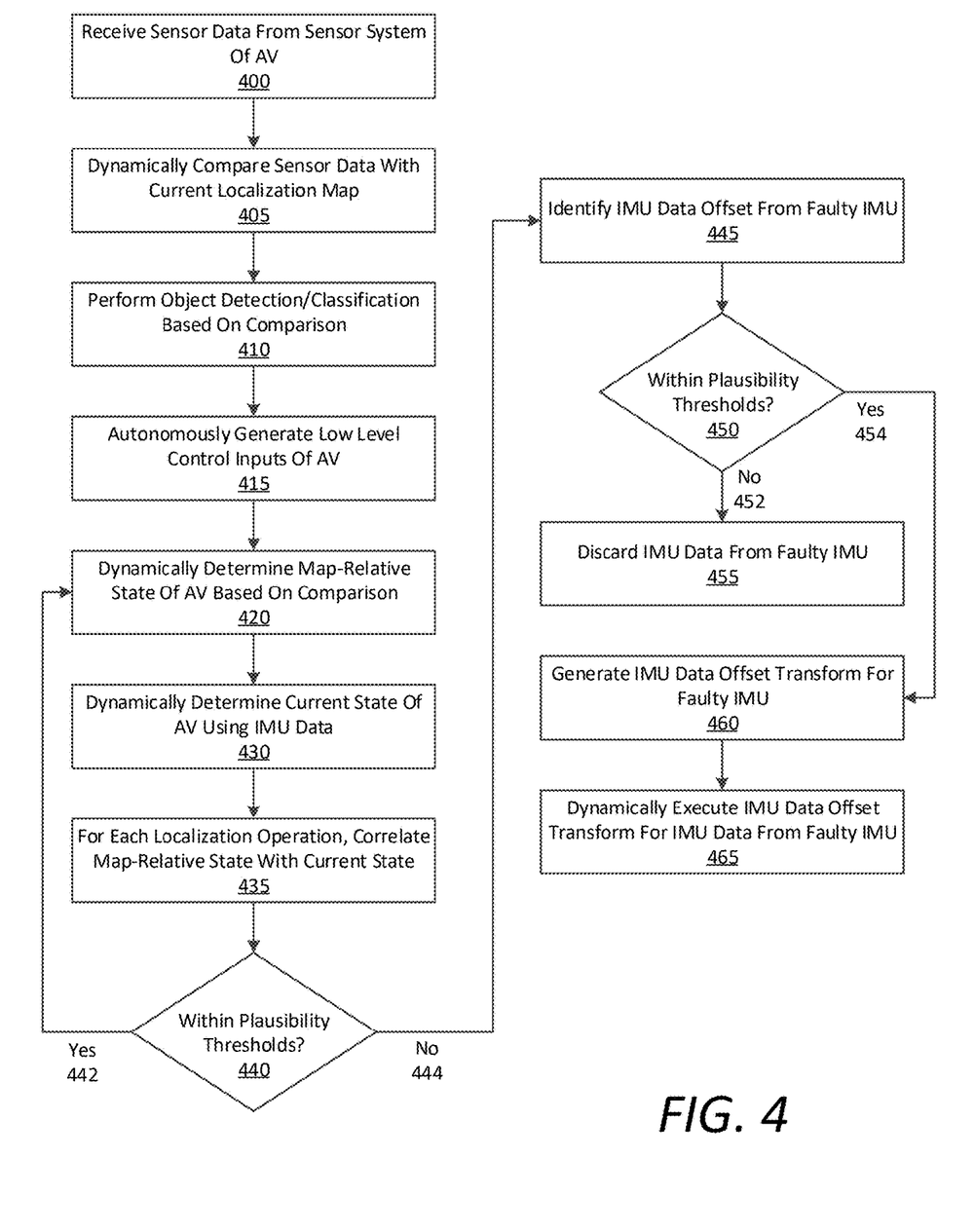
FIG. 4 is a flow chart describing a data correlation method of detecting and compensating for IMU data offset, according to example embodiments described herein.

FIG. 4 is a flow chart describing a data correlation method of detecting and compensating for IMU data offset, according to example embodiments described herein. In the below description of FIG. 4, reference may also be made to reference characters representing one or more features as shown and described with respect to FIGS. 1 and 2. Furthermore, the processes described in connection with FIG. 4 may be performed by one or more processing components of the vehicle control system 120 of FIG. 1. Referring to FIG. 4, the vehicle control system 120 can receive sensor data from the perception sensor system 110 of the autonomous vehicle 100 (400). The control system 120 can dynamically compare the sensor data with a current localization map, as described herein (405). Based on the dynamic comparison, the control system 120 can perform object detection and classification operations to determine any objects of interest or potential hazards along the autonomous vehicle's current route trajectory (410). Based on these perception, prediction, and motion planning operations, the vehicle control system 120 can autonomously generate low level control inputs, and execute the low-level control inputs on the vehicle control mechanisms 170 of the autonomous vehicle 100, such as the autonomous vehicle's acceleration, steering, and braking systems 172, 174, 176 (415).

Based on the comparison between the localization map and the live sensor view, the control system 120 can also continuously perform localization operations by determining the map-relative state of the autonomous vehicle 100 (420). The control system 120 can also continuously determine the current state of the autonomous vehicle 100 using IMU data (430). As described herein, the control system 120 can determine the map-relative state at a first rate, and the current state at a second rate that is significantly higher that the first rate. For each localization operation determining the map-relative state, the control system 120 can correlate the map-relative state with the current state (435). In other words, the control system 120 can correct or compensate for any drift in the current state that occurs between each iteration of determining the map-relative state (e.g., by recalibrating the continuous pose module 234.

According to various examples, the control system 120 can determine whether the current state is within a set of tolerance thresholds from the map-relative state (440). For example, the map-relative state and the current state can have a maximum expected divergence based on historical data and/or the quality of the IMU instruments, localization maps, and/or software version executing on the autonomous vehicle. If the map-relative state and the current state are within the set of tolerance thresholds (442), then the control system 120 can continue to dynamically determine sequential map-relative states and current states and perform the data correlation. However, if not (444), then the control system 120 determine whether a deficient IMU is responsible, and if so, can identify an IMU data offset from the deficient IMU (445). The control system 120 may then determine whether the IMU data from the deficient IMU is within a set of plausibility thresholds (450), as described herein. If not (452), the control system 120 can determine that the IMU data from the deficient IMU is unusable, and can therefore discard the IMU data from the deficient IMU (455). However, if the IMU data offset is within the set of plausibility thresholds (454), then the control system 120 can generate an IMU data offset transform for the deficient IMU (460). Thereafter, the control system 120 can dynamically execute the IMU data offset transform on the IMU data from the deficient IMU in order to correct or compensate for the IMU data offset (465).

It is contemplated that a fault in the IMU data can be registered by the control system 120 based on any number of factors, such as large swings in temperature, atmospheric conditions or barometric pressure, any jolts or shocks to the instruments, age or degradation, the quality of the instrument, a traffic accident, and the like. Such faults can occur at any given time and without warning. In accordance with the various embodiments described herein, the data correlation processes between the map-relative state and the current state can be leveraged to identify and mitigate or correct or compensate for IMU data offsets from deficient IMUs. Such processes described herein can result in more robust autonomy systems, bolstering the accuracy of the current state while minimizing drift in the current state. Accordingly, if an additional failure occurs (e.g., a LIDAR sensor failure), or if conditions change that affect the perception sensors (e.g., a rainstorm, snowstorm, or fog), the autonomous vehicle 100 can utilize the current localization map and the current state to park or pull over in the near-blind state, as opposed to entering a stuck state and potentially blocking normal road traffic.

Hardware Diagram

Figure 5:
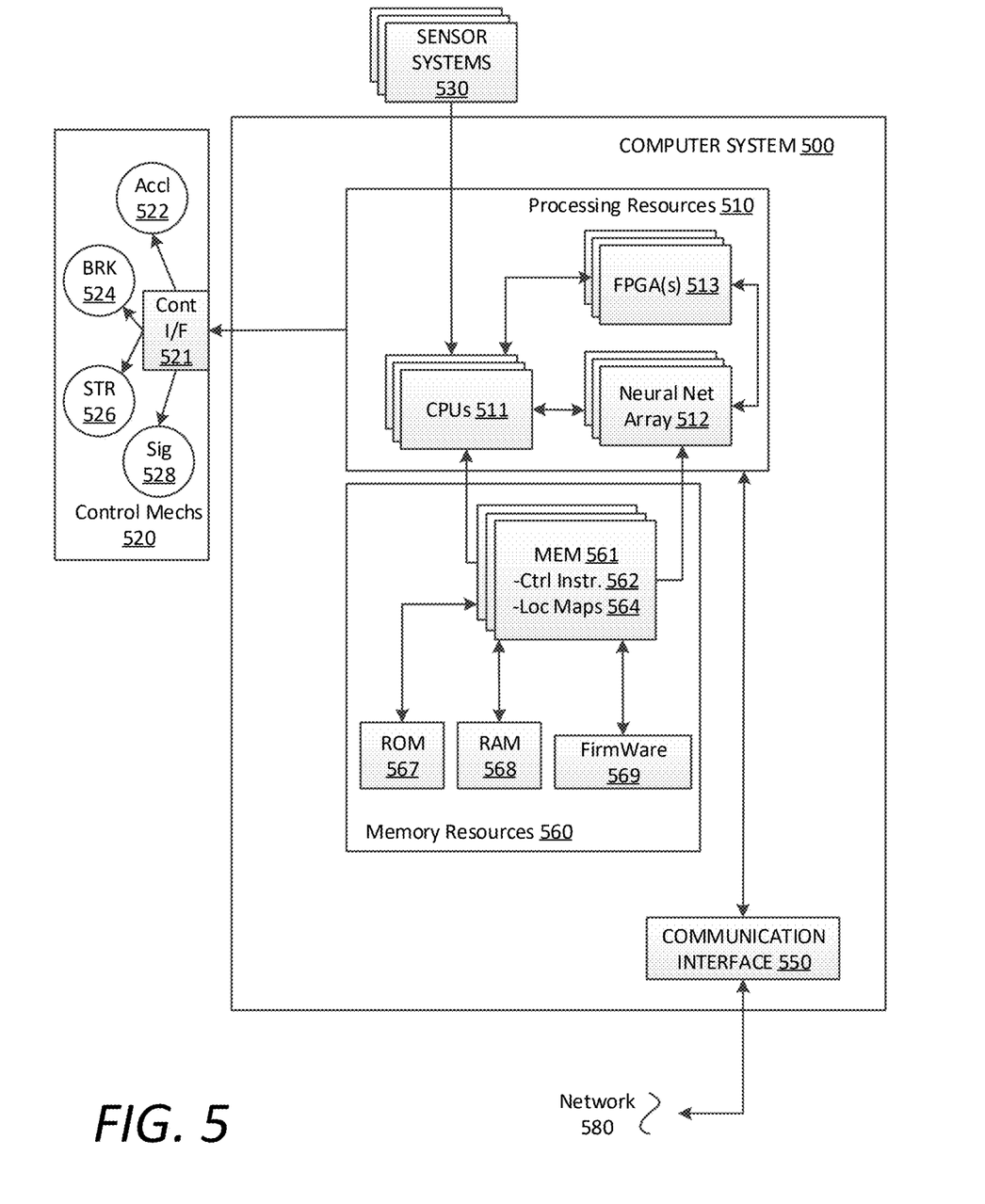
FIG. 5 is a block diagram illustrating a computer system upon which example processing systems of an autonomous vehicle unit described herein may be implemented.

FIG. 5 is a block diagram illustrating a computer system upon which example processing systems of an autonomous vehicle described herein may be implemented. The computer system 500 can be implemented using a number of processing resources 510, which can comprise computer processing (CPUs) 511 and field programmable gate arrays (FPGAs) 513. In some aspects, any number of processors 511 and/or FPGAs 513 of the computer system 500 can be utilized as components of a neural network array 512 implementing a machine learning model and utilizing road network maps stored in memory 561 of the computer system 500. In the context of FIGS. 1 and 2, various aspects and components of the control system 120 and localization engine 125, 200 can be implemented using one or more components of the computer system 500 shown in FIG. 5.

According to some examples, the computer system 500 may be implemented within an autonomous vehicle with software and hardware resources such as described with examples of FIGS. 1 and 2. In an example shown, the computer system 500 can be distributed spatially into various regions of the autonomous vehicle, with various aspects integrated with other components of the autonomous vehicle itself. For example, the processing resources 510 and/or memory resources 560 can be provided in a cargo space of the autonomous vehicle. The various processing resources 510 of the computer system 500 can also execute control instructions 562 using microprocessors 511, FPGAs 513, a neural network array 512, or any combination of the foregoing.

In an example of FIG. 5, the computer system 500 can include a communication interface 550 that can enable communications over a network 580. In one implementation, the communication interface 550 can also provide a data bus or other local links to electro-mechanical interfaces of the vehicle, such as wireless or wired links to and from control mechanisms 520 (e.g., via a control interface 521), sensor systems 530, and can further provide a network link to a backend transport management system or a remote teleassistance system (implemented on one or more datacenters) over one or more networks 580.

The memory resources 560 can include, for example, main memory 561, a read-only memory (ROM) 567, storage device, and cache resources. The main memory 561 of memory resources 560 can include random access memory (RAM) 568 or other dynamic storage device, for storing information and instructions which are executable by the processing resources 510 of the computer system 500. The processing resources 510 can execute instructions for processing information stored with the main memory 561 of the memory resources 560. The main memory 561 can also store temporary variables or other intermediate information which can be used during execution of instructions by the processing resources 510. The memory resources 560 can also include ROM 567 or other static storage device for storing static information and instructions for the processing resources 510. The memory resources 560 can also include other forms of memory devices and components, such as a magnetic disk or optical disk, for purpose of storing information and instructions for use by the processing resources 510. The computer system 500 can further be implemented using any combination of volatile and/or non-volatile memory, such as flash memory, PROM, EPROM, EEPROM (e.g., storing firmware 569), DRAM, cache resources, hard disk drives, and/or solid state drives.

The memory 561 may also store localization maps 564 in which the processing resources 510—executing control instructions 562—continuously compare to sensor data from the various sensor systems 530 of the autonomous vehicle. Execution of the control instructions 562 can cause the processing resources 510 to generate control commands in order to autonomously operate the autonomous vehicle's acceleration 522, braking 524, steering 526, and signaling systems 528 (collectively, the control mechanisms 520). Thus, in executing the control instructions 562, the processing resources 510 can receive sensor data from the sensor systems 530, dynamically compare the sensor data to a current localization map 564, and perform localization operations (e.g., determine the map-relative state) and generate control commands for operative control over the acceleration, steering, and braking of the AV along a particular route plan. The processing resources 510 may then transmit the control commands to one or more control interfaces 521 of the control mechanisms 520 to autonomously operate the autonomous vehicle along an autonomy route.

While examples of FIG. 5 provide for computing systems for implementing aspects described, some or all of the functionality described with respect to one computing system of FIG. 5 may be performed by other computing systems described with respect to FIG. 5.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A sensor data processing system for an autonomous vehicle, comprising:
   one or more processors; and
   a memory storing an instruction set that, when executed by the one or more processors, causes the sensor data processing system to:
   receive inertial measurement unit (IMU) data from one or more IMUs of the autonomous vehicle;
   based at least in part on the IMU data, identify an IMU data offset from a deficient IMU of the one or more IMUs;

determine whether the IMU data offset from the deficient IMU is within a set of plausibility thresholds;

in response to determining that the IMU data offset from the deficient IMU is within the set of plausibility thresholds, generate an offset compensation transform to compensate for the IMU data offset from the deficient IMU; and dynamically execute the offset compensation transform on the IMU data from the deficient IMU to dynamically compensate for the IMU data offset.

2. The sensor data processing system of claim 1, wherein the executed instruction set further causes the sensor data processing system to:

discard the IMU data from the deficient IMU in response to determining that the IMU data offset from the deficient IMU is not within the set of plausibility thresholds.

3. The sensor data processing system of claim 1, wherein the one or more IMUs comprise three or more IMUs, and wherein the executed instruction set causes the sensor data processing system to identify the IMU data offset from the deficient IMU based on comparing the IMU data from at least two other IMUs of the three or more IMUs with the IMU data from the deficient IMU.

4. The sensor data processing system of claim 1, wherein the executed instruction set causes the sensor data processing system to:

receive sensor data from a perception sensor system of the autonomous vehicle, the sensor data comprising a sensor view of a surrounding environment of the autonomous vehicle;

wherein the executed instruction set causes the sensor data processing system to identify the IMU data offset from the deficient IMU based on comparing the IMU data from the deficient IMU with the sensor data from the perception sensor system.

5. The sensor data processing system of claim 4, wherein the executed instruction set further causes the sensor data processing system to:

dynamically perform sequential localization operations by dynamically comparing the sensor view with a current localization map of a set of stored localization maps on the autonomous vehicle, the current localization map comprising ground truth data of a particular road segment on which the autonomous vehicle currently operates.

6. The sensor data processing system of claim 5, wherein the sequential localization operations are dynamically performed at a first rate, wherein the IMU data from the one or more IMUs are received at a second rate that is greater than the first rate, wherein the executed instruction set further causes the sensor data processing system to:

based on the IMU data, determine a current state of the autonomous vehicle at the second rate;

for each localization operation, determine a map-relative state of the autonomous vehicle; and between each sequential localization operation, correlate the map-relative state from a previous localization operation with the current state to determine whether the map-relative state from the previous localization operation is within a set of tolerance thresholds from the current state of the autonomous vehicle as determined from the IMU data.

7. The sensor data processing system of claim 6, wherein each of the map-relative state and the current state correspond to at least one of an orientation, a trajectory, a position in a local reference frame, a position in a global reference frame, or a velocity of the autonomous vehicle.

8. The sensor data processing system of claim 6, wherein the sequential set of localization operations corresponds to a map-relative filter, and wherein determining the current state of the autonomous vehicle based on the IMU data corresponds to a continuous pose filter.

9. The sensor data processing system of claim 4, wherein the perception sensor system comprises at least one of a camera system or a LIDAR sensor system.

10. The sensor data processing system of claim 1, wherein the one or more IMUs comprise at least one of an original equipment manufacturer's (OEM) IMU of the autonomous vehicle or an aftermarket IMU.

11. An autonomous vehicle comprising:
acceleration, braking, and steering systems;
a perception sensor system generating sensor data comprising a sensor view of a surrounding environment of the autonomous vehicle;
one or more inertial measurement units (IMUs); and
a control system comprising one or more processors executing an instruction set, causing the control system to:
process the sensor data to perform object detection operations and autonomously operate the acceleration, braking, and steering systems;
receive IMU data from the one or more IMUs;
based at least in part on the IMU data, identify an IMU data offset from a deficient IMU of the one or more IMUs;
determine whether the IMU data offset from the deficient IMU is within a set of plausibility thresholds;
in response to determining that the IMU data offset from the deficient IMU is within the set of plausibility thresholds, generate an offset compensation transform to compensate for the IMU data offset from the deficient IMU; and
dynamically execute the offset compensation transform on the IMU data from the deficient IMU to dynamically compensate for the IMU data offset.

12. The autonomous vehicle of claim 11, wherein the executed instruction set further causes the control system to:
discard the IMU data from the deficient IMU in response to determining that the IMU data offset from the deficient IMU is not within the set of plausibility thresholds.

13. The autonomous vehicle of claim 11, wherein the one or more IMUs comprise three or more IMUs, and wherein the executed instruction set causes the control system to identify the IMU data offset from the deficient IMU based on comparing the IMU data from at least two other IMUs of the three or more IMUs with the IMU data from the deficient IMU.

14. The autonomous vehicle of claim 11, wherein the executed instruction set causes the control system to:
receive the sensor data from the perception sensor system;
wherein the executed instruction set causes the control system to identify the IMU data offset from the deficient IMU based on comparing the IMU data from the deficient IMU with the sensor data from the perception sensor system.

15. The autonomous vehicle of claim 14, wherein the executed instruction set further causes the control system to:
dynamically perform sequential localization operations by dynamically comparing the sensor view with a current localization map of a set of stored localization maps on the autonomous vehicle, the current localization map comprising ground truth data of a particular road segment on which the autonomous vehicle currently operates.

16. The autonomous vehicle of claim 15, wherein the sequential localization operations are dynamically performed at a first rate, and wherein the executed instruction set further causes the control system to:
   based on the IMU data, determine a current state of the autonomous vehicle at a second rate that is greater than the first rate;
   for each of the sequential localization operations, determine a map-relative state of the autonomous vehicle; and
   between each sequential localization operation, correlate the map-relative state of a previous localization operation with the current state to determine whether the map-relative state from the previous localization operation is within a set of tolerance thresholds from the current state of the autonomous vehicle as determined from the IMU data.

17. The autonomous vehicle of claim 16, wherein each of the map-relative state and the current state correspond to at least one of an orientation, a trajectory, a position in a local reference frame, a position in a global reference frame, or a velocity of the autonomous vehicle.

18. A non-transitory computer readable medium storing instructions that, when executed by one or more processors of an autonomous vehicle, cause the one or more processors to:
   receive inertial measurement unit (IMU) data from one or more IMUs of the autonomous vehicle;
   based at least in part on the IMU data, identify an IMU data offset from a deficient IMU of the one or more IMUs;
   determine whether the IMU data offset from the deficient IMU is within a set of plausibility thresholds;
   in response to determining that the IMU data offset from the deficient IMU is within the set of plausibility thresholds, generate an offset compensation transform to compensate for the IMU data offset from the deficient IMU; and
   dynamically execute the offset compensation transform on the IMU data from the deficient IMU to dynamically compensate for the IMU data offset.

* * * * *